United States Patent [19]

Cavalli

[11] Patent Number: 4,560,111
[45] Date of Patent: Dec. 24, 1985

[54] ELECTRIC HOUSEHOLD APPLIANCE FOR CUTTING FRUIT, VEGETABLES AND SIMILAR FOOD PRODUCTS INTO SMALL STICKS OR CHUNKS OF VARIABLE THICKNESS

[76] Inventor: Alfredo Cavalli, Via Galileo Galilei, Pessano Con Bornago (Milan) 9, Italy

[21] Appl. No.: 567,944

[22] Filed: Jan. 4, 1984

[51] Int. Cl.[4] ............................................. B02C 18/18
[52] U.S. Cl. .................................... 241/92; 241/282.2; 241/286
[58] Field of Search ............ 83/666; 241/282.1, 282.2, 241/92, 296, 298, 286

[56] References Cited

U.S. PATENT DOCUMENTS 4,199,112  4/1980  McLean ................................ 241/92
4,364,525 12/1982  McClean ........................ 241/282.1 X
4,367,667  1/1983  Shibata ............................. 241/92 X

*Primary Examiner*—Mark Rosenbaum
*Attorney, Agent, or Firm*—Cohen, Pontani & Lieberman

[57] ABSTRACT

An electric household appliance comprises a container in which a motor-driven shaft is supported axially, a hopper-duct having an end opening into the container and extending parallel to and eccentrically of the shaft, a comb-shaped cutting tool fixed for rotation with the shaft at a distance from the open end of the hopper-duct equal to the length of its blades, a disc fixed for rotation with the shaft by means of a splined coupling and having a plurality of slots through which the blades of the cutting tool pass, the disc being located between the cutting tool and the open end of the hopper-duct, and a slicing blade fixed for rotation with the shaft. The slicing blade is structurally independent of the disc and extends coplanar with the open end of the hopper-duct to rotate edgewise thereto. The appliance also includes manually operable means for moving the disc away from or closer to the open end of the hopper-duct. The appliance allows fruit, vegetables and similar products to be cut into small sticks or chunks of a thickness which can be varied at will simply by adjusting the position of the disc on the shaft, the position of the disc being adjustable without having to dismantle and reassemble all the components of the appliance.

5 Claims, 9 Drawing Figures

ELECTRIC HOUSEHOLD APPLIANCE FOR CUTTING FRUIT, VEGETABLES AND SIMILAR FOOD PRODUCTS INTO SMALL STICKS OR CHUNKS OF VARIABLE THICKNESS

The present invention relates to electric household appliances for cutting fruit, vegetables and similar food products into small sticks or chunks of variable-thickness, comprising essentially a container, a motor-driven shaft extending longitudinally and axially in the container, a disc mounted on the motor-driven shaft with which it is fixed for rotation, a hopper-duct extending parallel to and eccentrically of the motor-driven shaft and having one end opening into the container for the introduction against the disc of food products to be cut, the disc defining an aperture for the passage of the cut products into the bottom of the container.

More particularly, the invention concerns an electric household appliance of the so-called multi-function type in that it can use different implements, tools or devices for performing corresponding functions such as, for example, mincing, slicing, cutting, squeezing, centrifuging, blending and the like.

With regard to electric appliances of this type, it is known that the present trend is to give them the greatest number of possible functions, widening the range of accessory tools. It is also known that one of the functions required most particularly from such electric appliances is that of cutting fruit, vegetables and similar food products into small sticks or chunks.

For such a function, it is necessary for the portion of food product to be cut between the disc and the end of the hopper-duct which opens into the container to be cut firstly into strips substantially perpendicular to the disc and then for these strips to be cut again in line with the end of the hopper-duct.

For this purpose, general use is made of a tool which, in most cases, comprises a plurality of blades fixed to the disc (or formed directly on the disc) and projecting from one face thereof, the blades being aligned radially on this face. Each blade has an essentially right-angled shape, with a portion perpendicular to the disc and a portion substantially parallel thereto. The blade portions perpendicular to the disc cut the product into strips, while the blade portions parallel to the disc further cut the strips as they are produced.

Thus, with each blade, the portion perpendicular to the disc must have an "earlier" impact on the product to be cut than that of the portion (of the blade) parallel to the disc.

Moreover, the transverse dimensions of the small sticks or chunks of product obtained are determined by the length of the blade portions perpendicular to the disc and by their mutual spacing in their radial alignment on the disc.

Consequently, in order to produce small sticks or chunks of different types with different transverse dimensions, it is necessary to vary the length and/or the distance between the blade portions perpendicular to the disc. Thus, it is necessary to provide as many tools (discs plus cutting blades) as the number of types of small sticks or chunks of product which are likely to be made. Moreover, it is necessary for each tool (particularly the disc part thereof) and the motor-driven shaft of the appliance to be formed such as to allow the disc to be positioned at a suitable distance from the end of the hopper-duct which opens into the container of the appliance in question.

In order to overcome the technical and economical disadvantages presented by the cutting tools of this type, it has been proposed to provide a plurality of open seats on one face of a disc, and to locate an essentially comb-shaped tool in each seat in a "disappearing" manner. More particularly, the respective cutting tool is angularly displaceable in each seat about a pin on which it is rotatably mounted between an operative position in which the blades project perpendicular to the disc, and an inoperative position in which the blades are withdrawn into the seat and in which a flat back of the tool reconstitutes the continuity of the surface of the disc considered.

According to this proposal, the dimensioning of the small sticks or chunks of product is entrusted solely to the distance between the blades of each tool.

In addition to the obvious, not inconsiderable difficulty of providing a disc with several cutting tools, and the costs involved in this provision, there is also a disadvantage of a strictly technical nature which rapidly renders the disc unusable.

Indeed, the very frequent knocks to which the blades of each tool are subject during cutting of a food product lead to corresponding fatigue of some importance in the supports for the pin, and in the pin on which the tool is mounted itself. Consequently, more or less considerable deformation of the pin may occur together with more or less rapid formation of play in the pin-support couplings, which may cause malfunctioning of the cutting tool or the actual detachment thereof from the support disc.

Another, not inconsiderable disadvantage is that waste collects easily in the seats formed in the disc for the "disappearing" support of the tools, the removal of which is essential and requires attention and time.

In view of the above, the technical problem which it is intended to solve by this invention is that of providing an electric household appliance of the type under consideration, having structural and functional characteristics such as to overcome the disadvatnages cited above with reference to the prior art.

This problem is resolved by an electric household appliance according to the invention, which is characterised in that it comprises:

a cutting tool which is structurally independent of the disc and includes a plurality of blades fixed in a comb-like manner to an arm fixed releasably for rotation with the motor-driven shaft relative to which the arm extends radially at a distance from that end of the hopper-duct opening into the container, which is substantially equal to the length of the blades, a plurality of slots defined by the disc, each of which is passed through by a corresponding blade of the cutting tool, the disc being axially movably coupled to the motor-driven shaft, and means for adjusting the position of the disc along the axis of the motor-driven shaft.

The electric appliance of the invention is further characterised in that it includes a slicing blade which projects laterally and radially with respect to a hub and is fixed coaxially for rotation with the mootr-driven shaft, the slicing blade being substantially coplanar with the end of the hopper-duct and rotating edgewise thereto.

According to a third characteristic of the invention, the disc with the slots through which the blades of the cutting tool pass is adjustably positioned between the cutting tool and the slicing blade.

The principle and more immediate advantage achieved by an electric appliance according to the invention is constituted by the fact that it includes a single disc and a single cutting tool for producing small sticks or chunks of any suitable food product, of any desired thickness, by simply varying the position of the disc on the motor-driven shaft. Consequently, since fewer accessories are necessary than in the prior art, clear advantages of economy of production and economy of space are achieved, together with facility of handling upon assembly and removal of the accessories.

A further important advantage achieved by the invention is constituted by the fact that the cutting tool has a precise position on the motor-driven shaft, a position which need not be varied when it is desired to vary the thickness of the small sticks or chunks produced.

The advantages are increased when the electric household appliance in question is of the multi-functional type. Indeed, it should be borne in mind that the slicing blade and the disc with the plurality of slots may be used for the widely required function of slicing fruit, vegetables and similar food products with the possiblity of varying the thickness of the slices at will.

Further characteristics and advantages will become clearer from the description of one embodiment of an electric household appliance according to the invention given below, by way of non-limiting example, with reference to the appended drawings, in which.

Figure 1:
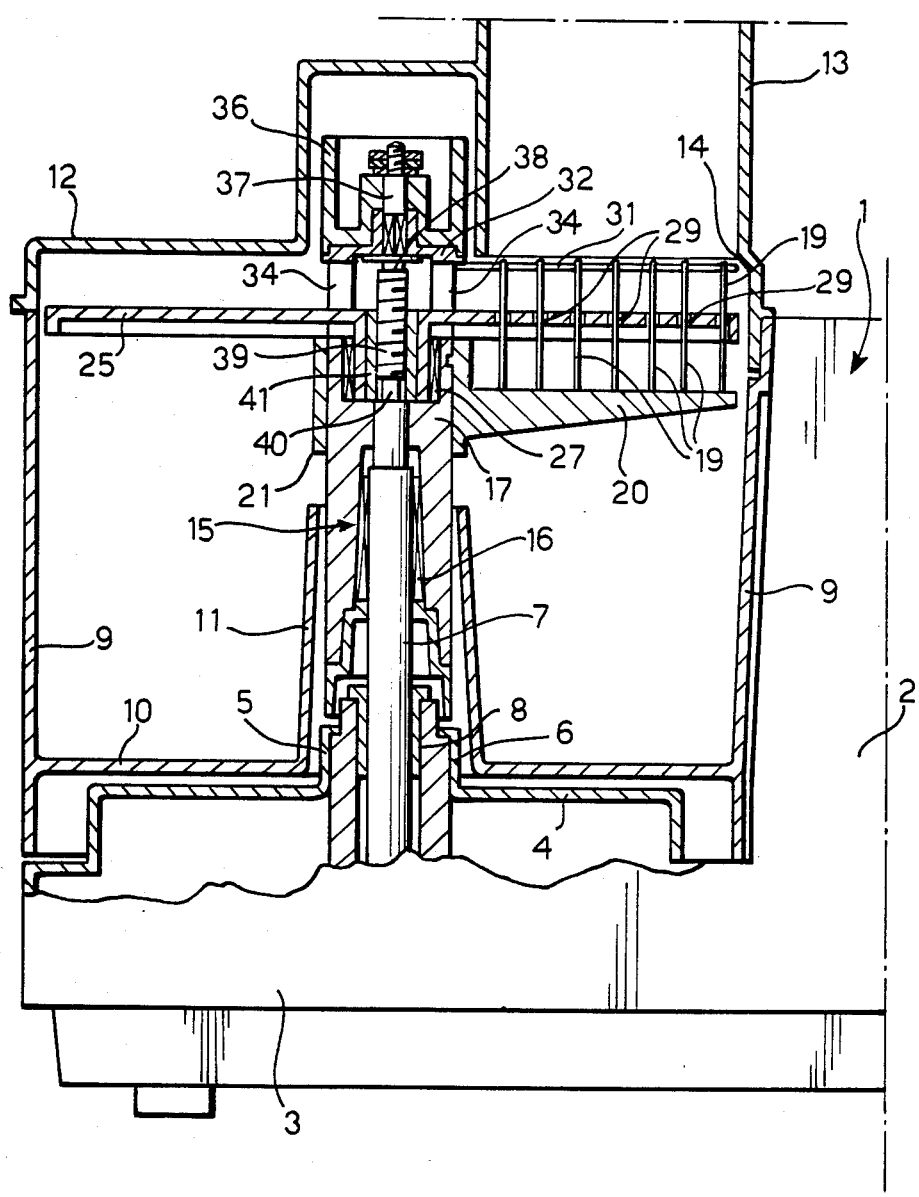
FIG. 1 shows, in section, an electric appliance according to the invention.

With reference to the drawings, an electric household appliance according to the invention comprises a box-like body 1 with one part 2 which is intended to receive a drive unit and its accessories, not shown since they are entirely conventional, and is alongside an essentially basal or support part 3. In the centre of the upper wall 4 of the base 3 is a substantially cylindrical projection 5 having an axial through-hole 6. A motor-driven shaft 7 is rotatably supported in the hole 6 with the interposition of bearings, schematically indicated 8.

A container 9 is intended to rest on the base 3 and has a bottom 10 provided centrally with a tubular part 11 which extends axially inwardly of the container itself. When the container 9 is located and locked on the base 3 by conventional means, not shown, the tubular portion 11 coaxially surrounds the motor-driven shaft 7 which thus extends axially within the container.

The container 9 can be closed by means of a lid 12 formed with a duct 13 which, when the lid is fitted on the container 9, extends eccentrically relative to the motor-driven shaft 7 and has an end 14 which opens into the container 9. The duct 13 is used for passing fruit, vegetables or similar food products which are to be cut into small sticks or chunks into the container 9. For this reason, the duct 13 will be called the hopper-duct in the following description and in the subsequent claims.

A shaft 15 having an axial through-hole is fitted axially onto the portion of the motor-driven shaft 7 which projects from the base 3, and is fixed for rotation with the motor-driven shaft, for example, by means of a splined coupling 16 or other similar coupling. The shaft 15 has an upper portion 17 extending into the container 9 above the tubular portion 11 thereof.

Figure 7:
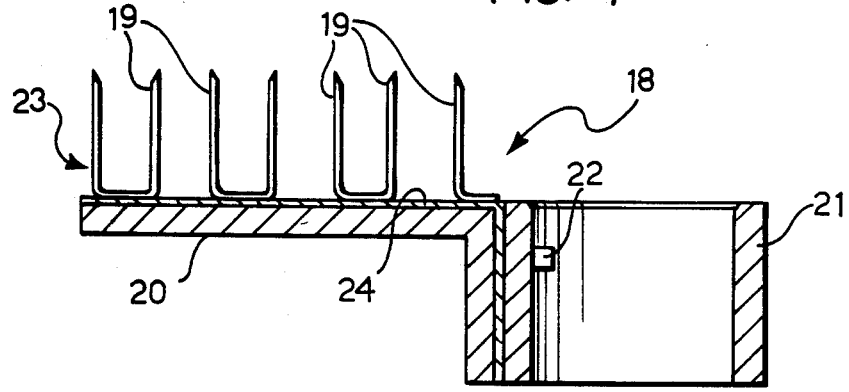
FIG. 7 is a sectional view, on an enlarged scale, or a cutting tool used in the electric appliance of FIG. 1.

A cutting tool used in the electric household appliance of the invention is generally indicated 18 (FIG. 7). This cutting tool 18 comprises a plurality of blades, each indicated 19, fixed essentially like a comb onto an arm 20. In its turn, the arm 20 is fixed so that it projects laterally from, or is formed in one piece with, a hollow hub 21 from which the arm 20 extends radially. On the inner wall of the hub 21 is formed or otherwise fixed a radial pin 22 by means of which the hub may be fixed coaxially and releasably by bayonet engagement to the upper portion 17 of the shaft 15, with which it is thus locked for rotation.

Clearly, the coupling between the hub 21 and the shaft 15 (that is to say, the coupling between the cutting tool 18 and the motor-driven shaft 7) may be achieved by other means entirely equivalent to bayonet engagement, which are well known in this branch of the art.

It should be noted that, with this coupling, the arm 20 is spaced from the end 14 of the hopper-duct 13 which opens into the container 9 by a distance equal to the length of the blades 19. Consequently, the upper ends of the blades are very close to the open end 14 of the hopper-duct 13.

In accordance with one preferred but non-limiting embodiment, the blades 19 mentioned above are constituted by the limbs of U-shpaed elements 23 (FIG. 7) which are sharpened on one edge and fixed, for example by welding, to a metal insert 24 formed with a right angle and embedded in the plastics material which preferably constitutes the arm 20 and its hub 21.

A disc 25 (FIGS. 4 and 5), also preferably of synthetic, atoxic plastics material, is provided at its centre with a tubular hub 26 by means of which the disc 25 is fixed coaxially for rotation to the portion 17 of the shaft 15 in a position between the cutting tool 18 and the open end 14 of the hopper-duct 13. The disc 25 can also be adjusted in its position along the axis of rotation of the shaft 15. For this purpose, the hub 26 of the disc 25 is mounted on the portion 17 of the shaft 15 by means of a splined coupling, schematically indicated 27. In accordance with a preferred embodiment which is clearly not limiting, the hub 26 of the disc 25 is engaged in a cylindrical cavity 28 formed coaxially in the upper end of the portion 17 of the shaft 15, the splined coupling being formed in the cavity.

Figure 6:
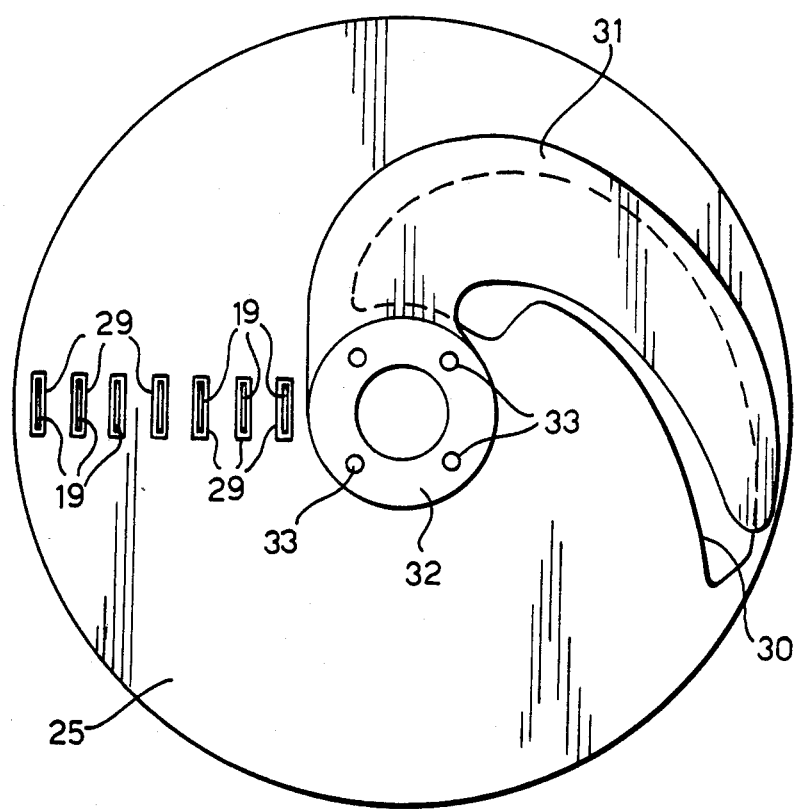
FIG. 6 is a schematic plan view of the basic components of the appliance of FIG. 1 for cutting food products of the type considered into small sticks or chunks.

The disc 25 is also formed with radially aligned slots 29 dimensioned so as to allow the free passage of the blades 19 of the cutting tool 18. (FIG. 6)

The disc 25 also defines, in an appropriate position, a large shaped aperture 30 for allowing the product cut into small sticks or chunks to pass into the bottom 10 of the container 9. (FIG. 6)

Figure 2:
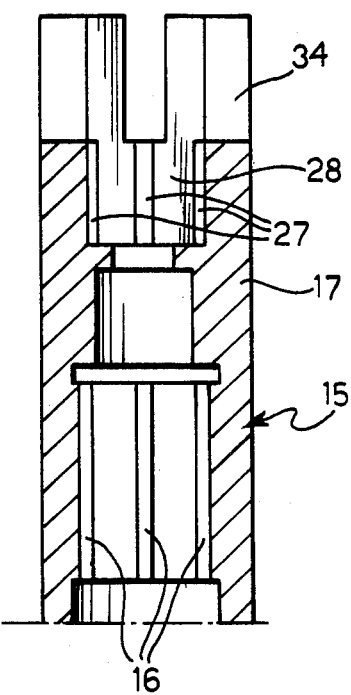
FIG. 2 is a longitudinal section showing a detail of the electric appliance of FIG. 1 on an enlarged scale.
Figure 3:
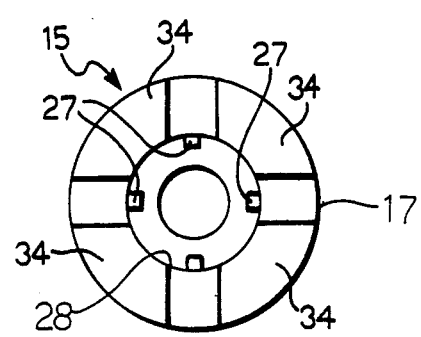
FIG. 3 is a plan view of the detail of FIG. 2.
Figure 4:
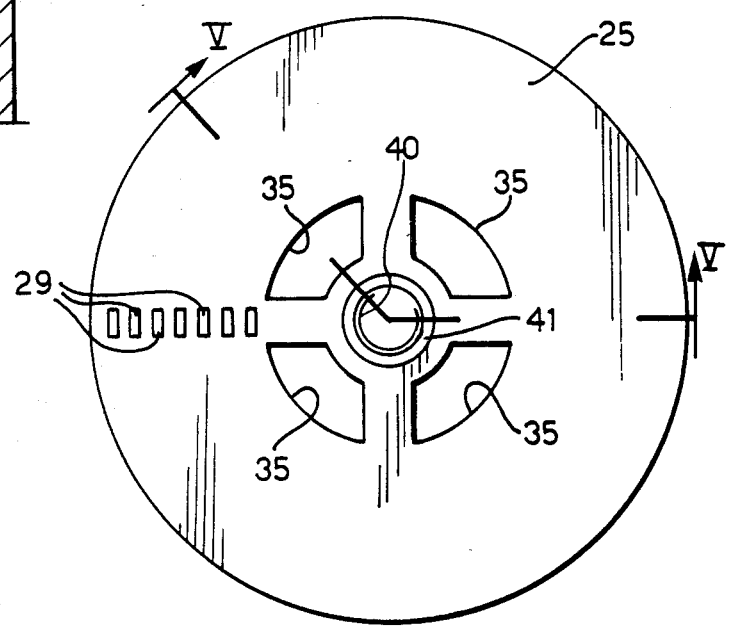
FIG. 4 is a plan view of a further detail of the machine of FIG. 1.
Figure 5:
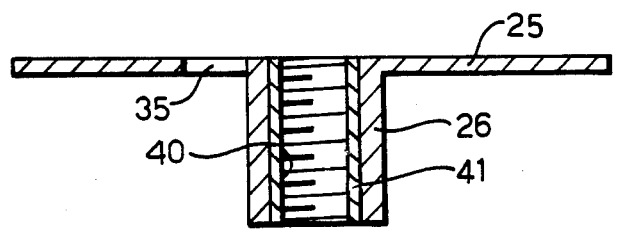
FIG. 5 is a section taken on line V—V of FIG. 4.

A slicing blade 31 has an annular portion 32 constituting essentially a flattened hub by means of which the blade is fixed for rotation with the motor-driven shaft 7. For this purpose, in accordance with one preferred embodiment, four columns 34 (FIGS. 2 and 3) are formed or otherwise fixed to the portion 17 of the hollow shaft 15 in positions diametrically opposite each other so that they extend parallel to the axis of the portion 17 and project beyond the cylindrical cavity 28 formed therein. It should be noted that the small columns 34 also pass beyond the disc 25 through four corresponding apertures 35 formed therein (FIG. 4). The flattened hub 32 of the slicing blade 31 is fixed to the upper ends of the columns 34, for example, by means of screws schematically indicated 33. (FIG. 6)

The slicing blade 31 extends so as to be coplanar with the open end 14 of the hopper-duct 13 and rotates edgewise thereto.

It should be noted in particular that the angular position of the slicing blade 31 and the cutting tool 18 relative to the axis of rotation of the motor-driven shaft 7 is chosen so that the blades 19 of the cutting tool have an earlier impact on the product to be cut than the slicing blade 31.

A knob 36 rests so as to be freely rotatable on the flattened hub 32, and the upper portion 37 of a shaft, generally indicated 38, extending coaxially with the motor driven shaft 7 is fixed axially to the knob 36. The shaft 38 has a lower threaded portion 39 screwed into a threaded hole 40 formed axially in a metal insert 41 embedded coaxially in the hub 26 of the disc 25.

Rotation of the knob 36 causes the screwing or unscrewing of the threaded portion 39 of the shaft 38 relative to the threaded hole 40 and hence causes a movement of disc 25 along the axis of the motor-driven shaft 7. Consequently, the disc may be located at any position between the cutting device 18 and the slicing blade 31.

Figure 8:
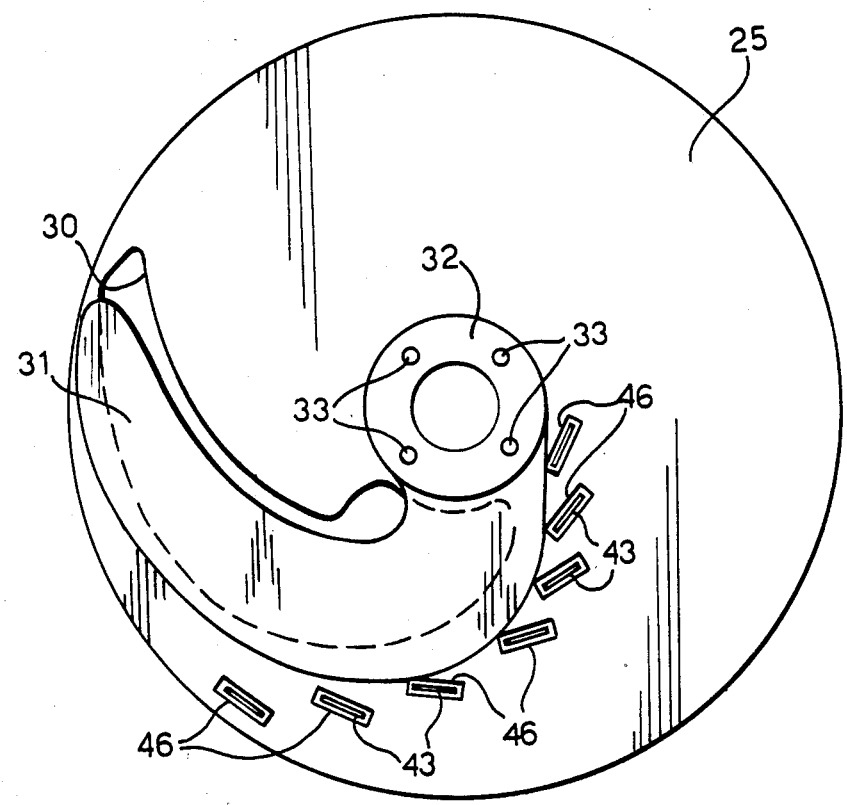
FIG. 8 is a variant of the components of FIG. 6.
Figure 9:
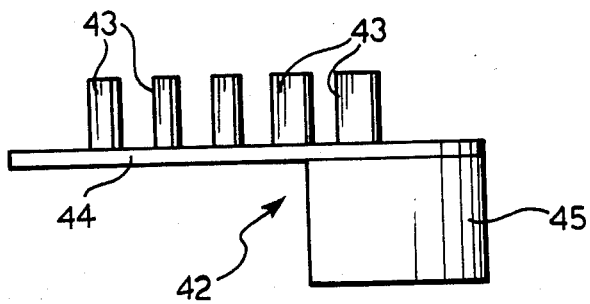
FIG. 9 is a schematic side view of a cutting tool according to a variant.

FIG. 9 shows a variant of the cutting tool, now generally indicated 42. According to this variant, the tool comprises an arm 44 fixed laterally to or formed in one piece with a hollow hub 45, and a plurality of blades 43 fixed to the arm 44 and extending parallel to the axis of the hollow hub 45. More particularly (FIG. 8) the blades 43 are located along a curved line with a profile substantially the same as the cutting profile of the slicing blade 31,for example, a profile substantially in the form of a portion of a spiral with the convex side facing in the direction of rotation. Thus,the blades 43 come into contact with the product to be cut one after the other and avoid exerting a tearing effect on the product, which could occur if all the blades of a cutting tool contact the product simultaneously.

Clearly, the disc 25 (FIG. 8) will have a line of slots 46 corresponding to the blades 43 of the cutting tool 42.

The main advantage of this invention is that of enabling the thickness of the small sticks or chunks of food product cut by the electric appliance described above to be varied at will. Indeed, by operating the knob 36, one can vary the position of the disc 25 relative to the open end 14 of the hopper-duct 13 and vary the thickness of food product which projects from the hopper into the container 9 and rests or bears on the disc 25. It should be noted that the adjustment of the position of the disc 25 occurs without any adjustment of the portion of the cutting tool 18 which remains locked in its initial predetermined position on the hollow shaft 15; this is contrary to what is required in the electric household appliances of prior art. This is a further important advantage achieved by the present invention.

Another advantage becomes evident when the electric appliance described above is of the multi-function type. Indeed, in this case, the slicing blade 31 and the disc 25 (still being adjustably positionable relative to the axis of the motor-driven shaft 7) constitute the tools for the function of slicing food products with the possibility of varying the thickness of the slices obtained. Consequently, in such a multi-function electric appliance it is possible, with only three accessories(the cutting tool 18, the disc 25 and the slicing blade 31) to carry out two basic functions: that of slicing and that of cutting into small sticks or chunks of variable thicknesses.

A further, not inconsiderable advantage is constituted by the fact that the aforementioned adjustable positioning of the disc 25 can be achieved by operating a knob which is readily accessible upon the simple removal of the lid 12.

I claim:

1. An electric household appliance for cutting fruit, vegetables and similar food products into small sticks or chunks of variable thickness, of the type including a container; a motor-driven shaft extending longitudinally and axially in the container; a disc mounted on said shaft for rotation therewith; a hopper-duct extending parallel to and eccentrically of said shaft and opening into said container at one end for the introduction against said disc of food products to be cut, and an aperture defined in the disc for the passage of the cut food products into the bottom of the container, wherein the improvements consist in the appliance further including:

a cutting tool which is structurally independent of said disc and releasably fixed to said shaft, the cutting tool including an arm fixed releasably for rotation with said shaft for releasably fixing said cutting tool to said shaft and a plurality of blades fixed in a comb-like manner to the arm, said arm extending radially of the shaft at a distance from said open end of the hopper-duct substantially equal to the length of the blades;

a plurality of slots defined by the disc, through each of which passes a respective blade of the cutting tool;

means for axially movably coupling said disc to said motor-driven shaft, means for adjusting the axial position of said disc along said shaft, a hub fixed coaxially for rotation with said motor-driven shaft, and a slicing blade which projects laterally and radially from said hub, the slicing blade being substantially coplanar with said open end of the hopper-duct and rotating edgewise thereto and being structurally independent of said disc and said cutting tool, said appliance being capable of cutting food into small sticks when both said cutting tool and said blades are present on said shaft and slicing food when said cutting tool is removed; whereby the interaction of said cutting tool, said disc and said slicing blade can accomplish both slicing and cutting of food into small sticks of variable thicknesses.

2. An electric appliance as defined in claim 1, wherein said disc is adjustably positioned between the cutting tool and the slicing blade.

3. An electric appliance as defined in claim 2, wherein said cutting tool and said disc have respective hubs, and the blades of the cutting tool and the slots of the disc are aligned radially relative to the respective hubs.

4. An electirc appliance as defined in claim 2, wherein said cutting tool and said disc have respective hubs, and the blades of the cutting tool and the slots of the disc are aligned in a curve which extends substantially in a spiral relative to the respective hubs and has its convex side facing in the direction of rotation of said hubs.

5. An electric appliance as defined in claim 1, wherein said means for adjusting the axial position of said disc along the motor-driven shaft comprise a knob supported rotatably in a fixed position relative to said shaft; a threaded hole formed axially in the hub of said disc, and a shaft having a threaded end portion screwed into said hole and its opposite end portion fixed for rotation with said knob.

* * * * *